United States Patent
Eto

(10) Patent No.: US 11,925,992 B2
(45) Date of Patent: Mar. 12, 2024

(54) METHOD OF SETTING HEAT-RESISTANT ALLOY CUTTING CONDITIONS AND METHOD OF CUTTING HEAT-RESISTANT ALLOY

(71) Applicant: MITSUBUSHI HEAVY INDUSTRIES, LTD., Tokyo (JP)

(72) Inventor: Jun Eto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 479 days.

(21) Appl. No.: 17/106,852

(22) Filed: Nov. 30, 2020

(65) Prior Publication Data

US 2021/0078125 A1    Mar. 18, 2021

Related U.S. Application Data

(62) Division of application No. 16/329,093, filed as application No. PCT/JP2017/024390 on Jul. 3, 2017, now abandoned.

(30) Foreign Application Priority Data

Sep. 2, 2016 (JP) .................................. 2016-171978

(51) Int. Cl.
*B23Q 15/013* (2006.01)
*B23C 5/10* (2006.01)
(Continued)

(52) U.S. Cl.
CPC ................ *B23C 5/10* (2013.01); *B23Q 15/00* (2013.01); *B23Q 15/013* (2013.01); *B23Q 15/08* (2013.01);
(Continued)

(58) Field of Classification Search
None
See application file for complete search history.

(56) References Cited

U.S. PATENT DOCUMENTS

| 6,662,073 B1 | 12/2003 | Fujishima et al. |
| 2004/0258496 A1 | 12/2004 | Marusich et al. |

(Continued)

FOREIGN PATENT DOCUMENTS

| EP | 2878404 A1 | 6/2015 |
| JP | 08019912 A | 1/1996 |

(Continued)

OTHER PUBLICATIONS

Decision of Refusal for Japanese Application No. 2016-171978 dated Mar. 16, 2021; 5pp.

(Continued)

*Primary Examiner* — Ryan A Jarrett
(74) *Attorney, Agent, or Firm* — HAUPTMAN HAM, LLP

(57) ABSTRACT

In a method of setting heat-resistant alloy cutting conditions used to set cutting conditions under which a heat-resistant alloy is cut with a cutting tool, the cutting tool has a long shaft mounted on a spindle and extended in the axial direction and teeth formed on the shaft. The cutting conditions include a radial direction cutting amount of the cutting tool in the radial direction. When the radial direction cutting amount in which one tooth is constantly in contact with the heat-resistant alloy is given as a smallest radial direction cutting amount and the radial direction cutting amount in which three or more teeth are not in contact with the heat-resistant alloy is given as a largest radial direction cutting amount, a radial direction cutting amount of the (Continued)

cutting tool is set in the range from the smallest radial direction cutting amount to the largest radial direction cutting amount.

7 Claims, 7 Drawing Sheets

(51) Int. Cl.
  *B23Q 15/00* (2006.01)
  *B23Q 15/08* (2006.01)
(52) U.S. Cl.
  CPC ...... *B23C 2220/48* (2013.01); *B23C 2222/88* (2013.01); *Y10T 409/300896* (2015.01); *Y10T 409/303808* (2015.01)

(56) References Cited

U.S. PATENT DOCUMENTS

| | | |
|---|---|---|
| 2005/0019121 A1 | 1/2005 | Suttor et al. |
| 2007/0245799 A1 | 10/2007 | Asakawa |
| 2007/0248422 A1 | 10/2007 | Song |
| 2007/0258777 A1 | 11/2007 | Gunther et al. |
| 2008/0304923 A1 | 12/2008 | Lehto et al. |
| 2012/0183363 A1 | 7/2012 | Davis et al. |
| 2013/0170916 A1 | 7/2013 | Xu et al. |
| 2013/0336731 A1 | 12/2013 | Nagashima et al. |
| 2014/0205390 A1 | 7/2014 | Baba et al. |
| 2017/0028482 A1 | 2/2017 | Boulakhov et al. |
| 2017/0100786 A1 | 4/2017 | Shpigelman |
| 2017/0220025 A1* | 8/2017 | Kawai .............. G05B 19/40937 |
| 2019/0091778 A1 | 3/2019 | Hayasaka et al. |

FOREIGN PATENT DOCUMENTS

| | | |
|---|---|---|
| JP | 3041243 U | 9/1997 |
| JP | 11267914 A | 10/1999 |
| JP | 2001239403 A | 9/2001 |
| JP | 2002307224 A | 10/2002 |
| JP | 2004034171 A | 2/2004 |
| JP | 2005199421 A | 7/2005 |
| JP | 2008114333 A | 5/2008 |
| JP | 2009056533 A | 3/2009 |
| JP | 2012183597 A | 9/2012 |
| JP | 2016005860 A | 1/2016 |
| WO | 0203155 A1 | 1/2002 |
| WO | 2005058532 A1 | 6/2005 |

OTHER PUBLICATIONS

Extended European Search Report for European Application No. 17845876.6 ated Aug. 8, 2019; 7pp.

International Search Report and Written Opinion for International Application No. PCT/JP2017/024390 dated Oct. 3, 2017; 16pp.

* cited by examiner

METHOD OF SETTING HEAT-RESISTANT ALLOY CUTTING CONDITIONS AND METHOD OF CUTTING HEAT-RESISTANT ALLOY

RELATED APPLICATIONS

The present application is a divisional of U.S. application Ser. No. 16/329,093, filed Feb. 27, 2019, which is a National Phase of International Application Number PCT/JP2017/024390 filed Jul. 3, 2017, which claims priority to Japanese Application Number 2016-171978 filed Sep. 2, 2016.

FIELD

The present invention relates to a method of setting a heat-resistant alloy cutting condition in cutting a heat-resistant alloy with a cutting tool, and a method of cutting a heat-resistant alloy.

BACKGROUND

With the intention to discharge heat generated during cutting and to perform cooling, such a cutter is conventionally known (for example, see Patent Literature 1) that has a plurality of straight teeth or helical teeth formed around the outer circumference of the cylinder, a flute formed for each tooth, and a through-hole to circulate air or coolant around the tooth surface. In the cutter, the ratio between the number of cutter teeth and the cutter diameter is set at at least 0.75:1. This cutter has a cutting speed of the teeth of at least 400 teeth-per-second.

CITATION LIST

Patent Literature

Patent Literature 1: United States Patent Application Laid-open No. 2004/0258496

SUMMARY

Technical Problem

Examples of a material to be machined include heat-resistant alloys such as titanium alloy. Titanium alloy has lower thermal conductivity and is thus easy to accumulate machining-induced heat generated during cutting. In addition, titanium alloy has higher Young's modulus and has larger cutting resistance. Machining-induced heat is thus easy to be generated. Titanium alloy is therefore usually cut at a lower cutting speed to suppress generation of such machining-induced heat. Such a lower cutting speed reduces the efficiency of work, and as a solution to suppress a reduction in the efficiency of work, the cutter has an increased amount of cutting per tooth.

Cutting work at a lower speed with an increased cutting amount per tooth needs a large cutting tool and accordingly needs a large machine to which such a large cutting tool is installed. Cutting work is therefore difficult to be performed on a small piece having a small portion to be machined, and a large piece is the only option to be machined, which makes the tool less versatile. Consequently, a wide variety of cutting tools are necessary depending on the type of piece to be machined. In addition, a large piece needs to be fixed. An increase in the size of machine is therefore inevitable.

In view of the above-described problems, the present invention has an object to provide a method of setting heat-resistant alloy cutting conditions and a method of cutting a heat-resistant alloy, which are widely applicable and capable of suppressing a reduction in the efficiency of cutting work on the heat-resistant alloy.

Solution to Problem

A method of setting a heat-resistant alloy cutting condition according to the present invention is a method of setting a heat-resistant alloy cutting condition that is used to set a cutting condition under which a heat-resistant alloy is cut with a cutting tool mounted on a spindle. The cutting tool includes a long shaft mounted on the spindle and extended in an axial direction and a plurality of teeth disposed on an outer circumference of the shaft. The cutting condition includes a radial direction cutting amount in a radial direction of the cutting tool. When the radial direction cutting amount in which one of the teeth is constantly in contact with the heat-resistant alloy is given as a smallest radial direction cutting amount, and the radial direction cutting amount in which three or more teeth of the teeth are not in contact with the heat-resistant alloy is given as a largest radial direction cutting amount, the method includes setting the radial direction cutting amount of the cutting tool in a range from the smallest radial direction cutting amount to the largest radial direction cutting amount.

With this configuration, the cutting tool can cut the heat-resistant alloy with at least a tooth of a plurality of teeth of the tool constantly in contact with the heat-resistant alloy. This can suppress vibration of the cutting tool, which is caused with the teeth of the cutting tool separated from the heat-resistant alloy. Moreover, with this configuration, the cutting tool can cut the heat-resistant alloy with three or more teeth of the teeth of the tool not in contact with the heat-resistant alloy. This can suppress chatter vibration of the cutting tool, which is caused with three or more teeth of the tool contacting the heat-resistant alloy. Suppressing vibration of the cutting tool can increase the amount of cutting of the cutting tool and thus can suppress a reduction in the efficiency of cutting work on the heat-resistant alloy. This can increase the amount of cutting of the cutting tool, and therefore allows even a small cutting tool to perform sufficient cutting work without reducing the efficiency of work. It is therefore possible to provide cutting work on even a small piece and to make the tool versatile. Furthermore, suppressing vibration of the cutting tool can suppress teeth wear of the cutting tool and thus can extend the life of the cutting tool. A small cutting tool has a small amount of cutting in the radial direction, which is beneficial in suppressing generation of machining-induced heat per tooth. The efficiency of cutting work can be improved by increasing the number of cuttings per revolution by increasing the number of teeth and further improved by increasing the rotational speed of the cutting tool.

Preferably, the cutting condition includes a condition under which the cutting tool cuts the heat-resistant alloy at a constant radial direction cutting amount.

This configuration can achieve stable cutting work by making the diameter direction cutting amount of the cutting tool constant.

Preferably, when a length of projection of the cutting tool from the spindle is given as L and a tool diameter of the cutting tool is given as D, the cutting condition includes a condition under which L/D is equal to or greater than 3.5.

This configuration can increase the length of projection of the cutting tool, which allows the cutting tool, fixed to the spindle, to be less rigid and to have lower eigenfrequency. When the eigenfrequency of the cutting tool gets close to a usable rotational speed of the spindle, the amount of cutting of the cutting tool is increased, which can further improve the efficiency of cutting work. The ratio L/D needs to be equal to or greater than 3.5, preferably equal to or greater than 4.5, optimally 5. When the number of teeth of the cutting tool is given as N, a cutting condition (L/D)×N, consisting of L/D and N, is preferably from 40 to 120 when L/D is 3.5 to 5, and preferably equal to or greater than 90 when L/D is larger than 5. The tool has, for example, a diameter D of 20 mm and a projection length L of 70 mm.

Preferably, a stable rotational speed of the spindle is calculated using a certain formula based on a parameter including an eigenfrequency of the cutting tool; a cutting speed of the cutting tool is calculated using a certain formula based on a parameter including the calculated stable rotational speed; and when the calculated cutting speed is given as Vcn [m/min], the cutting condition includes a condition under which the cutting tool fulfilling 100 [m/min]<Vcn [m/min]<300 [m/min] is selected.

This configuration allows the cutting tool to cut the heat-resistant alloy at a proper cutting speed with the spindle rotating at a stable rotational speed.

Preferably, a plurality of the stable rotational speeds are calculated; a plurality of the cutting speeds are calculated based on the stable rotational speeds; a largest cutting speed of the cutting speeds, fulfilling 100 [m/min]<Vcn [m/min] <300 [m/min] is selected; and the cutting condition includes a condition under which the stable rotational speed corresponding to the selected cutting speed is set as a spindle rotational speed of the spindle.

This configuration allows the cutting tool to cut the heat-resistant alloy at a higher cutting speed with the spindle rotating at a stable rotational speed, which can improve the efficiency of cutting work.

Preferably, the cutting condition includes a feed rate per tooth of the cutting tool, and the feed rate per tooth of the cutting tool is set based on a cut cross-sectional area per tooth, given by multiplying a thickness of removal by a width of cutting, and an amount of inclination of the cutting tool with respect to the axial direction.

This configuration can achieve a proper feed rate per tooth of the cutting tool, which enables more proper cutting.

Preferably, when at least one of the thickness of removal and the amount of inclination is equal to or greater than a preset threshold, the feed rate per tooth of the cutting tool is reset to be smaller than the feed rate previously set.

With this configuration, if the cutting tool has an improper feed rate per tooth, the feed rate per tooth can be reset to a proper rate.

Another method of setting a heat-resistant alloy cutting condition according to the present invention is method of setting a heat-resistant alloy cutting condition that is used to set a cutting condition under which a heat-resistant alloy is cut with a cutting tool mounted on a spindle. When a length of projection of the cutting tool from the spindle is given as L and a tool diameter of the cutting tool is given as D, the cutting condition includes a condition under which L/D is equal to or greater than 3.5.

This configuration can increase the length of projection of the cutting tool, which allows the cutting tool, fixed to the spindle, to be less rigid and to have lower eigenfrequency. When the eigenfrequency of the cutting tool gets close to the rotational speed of the spindle, the amount of cutting of the cutting tool is increased, which can further improve the efficiency of cutting work.

A method of cutting a heat-resistant alloy according to the present invention includes cutting the heat-resistant alloy using the cutting tool under the cutting condition set by the method of setting a heat-resistant alloy cutting condition according to any one of the methods of setting a heat-resistant alloy cutting condition.

This configuration allows even a small cutting tool to perform sufficient cutting work on the heat-resistant alloy without reducing the efficiency of work. It is therefore possible to provide cutting work on even a small piece. This configuration can therefore make the tool versatile while suppressing a reduction in the efficiency of cutting work on the heat-resistant alloy.

DESCRIPTION OF EMBODIMENTS

An embodiment of the present invention will now be described in detail with reference to the drawings. It should be noted that the embodiment is not intended to limit the present invention. The components in the embodiment include what the skilled person could easily replace and what are substantially the same. The following components can be combined with one another as appropriate. In the case of a plurality of embodiments, the embodiments can be combined with one another.

Embodiment

Figure 1:
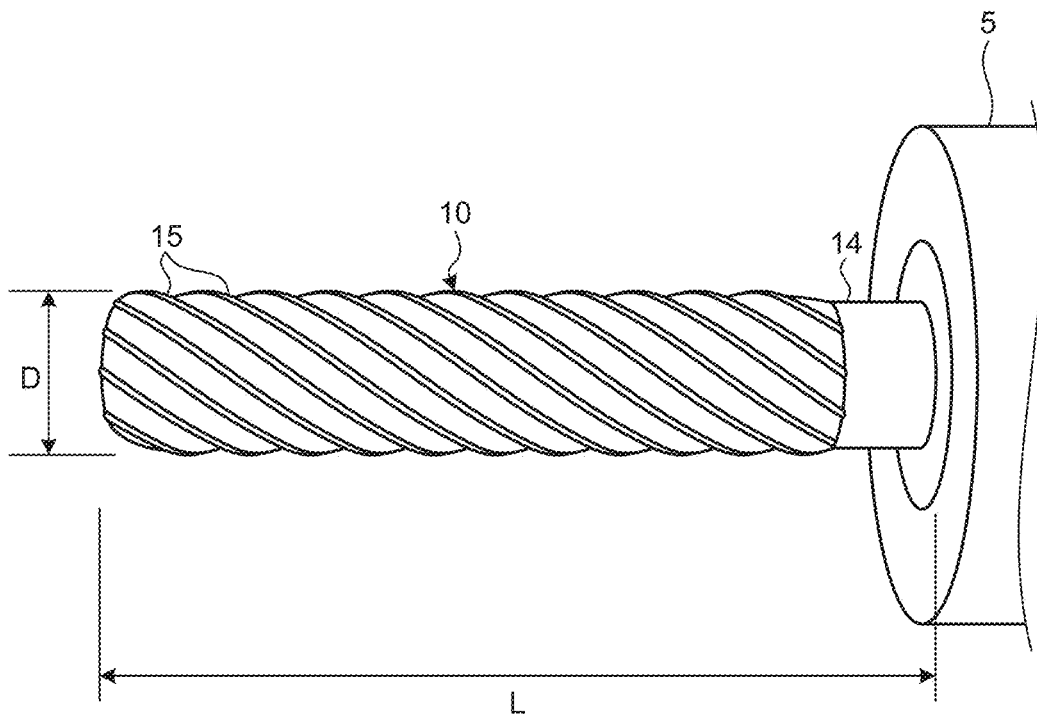
FIG. 1 is a schematic view of a cutting tool according to an embodiment.
Figure 2:
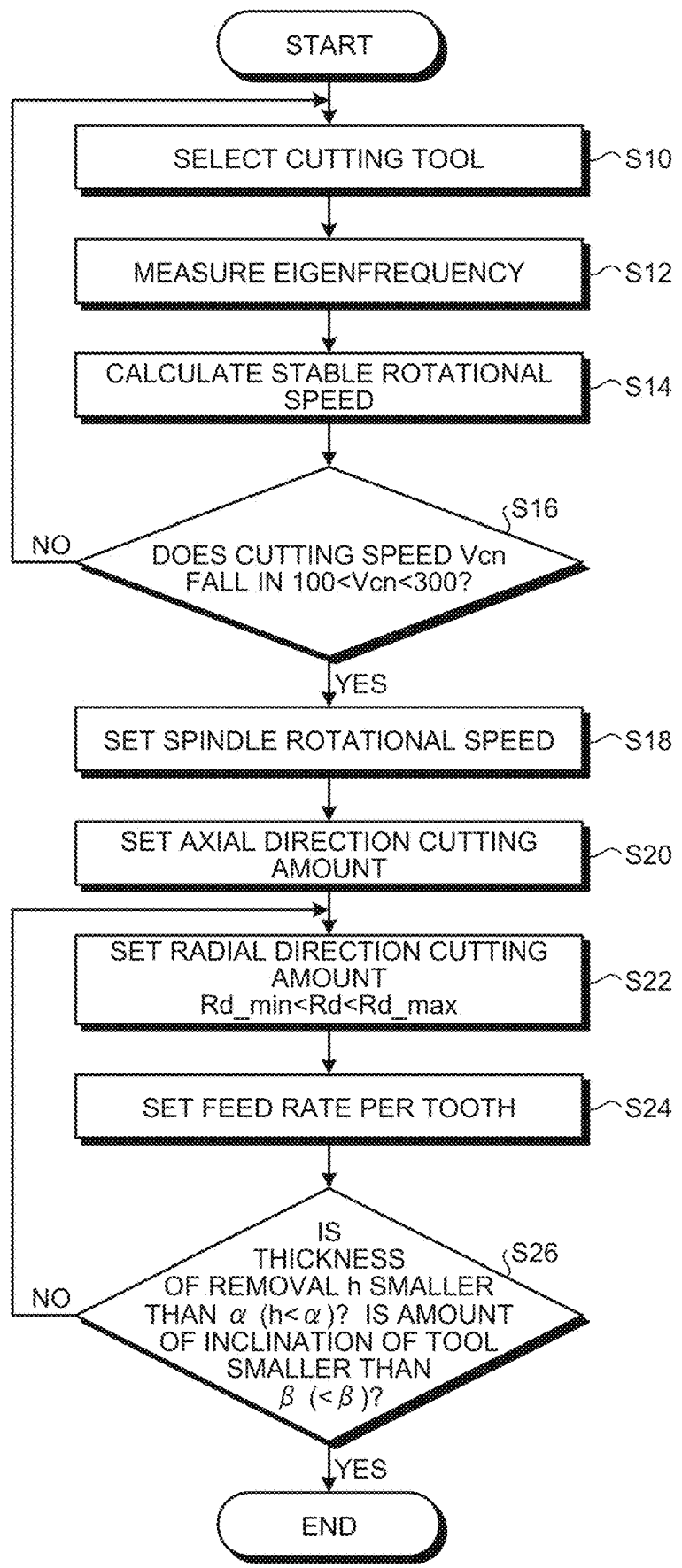
FIG. 2 is a flowchart of a method of setting cutting conditions according to the embodiment.
Figure 3:
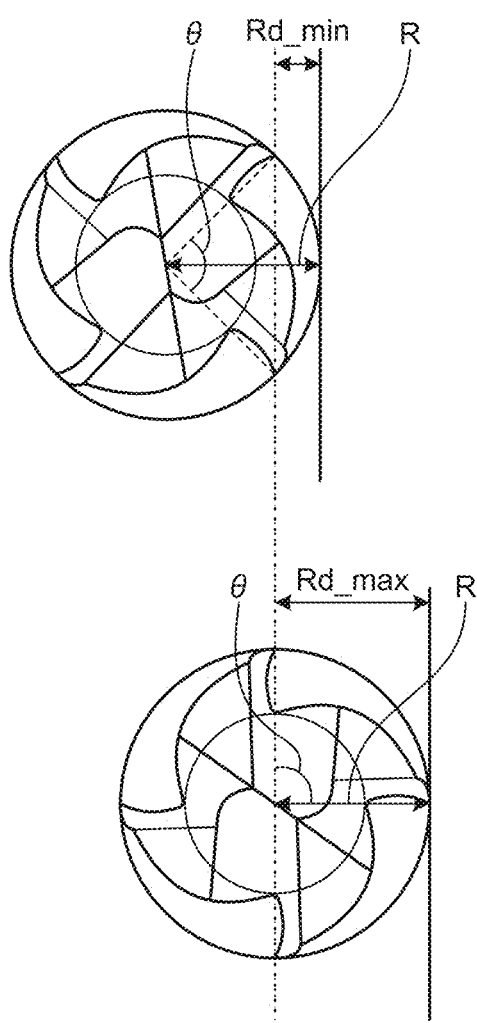
FIG. 3 is an illustrative drawing relating to the amount of cutting of the cutting tool in the radial direction.
Figure 4:
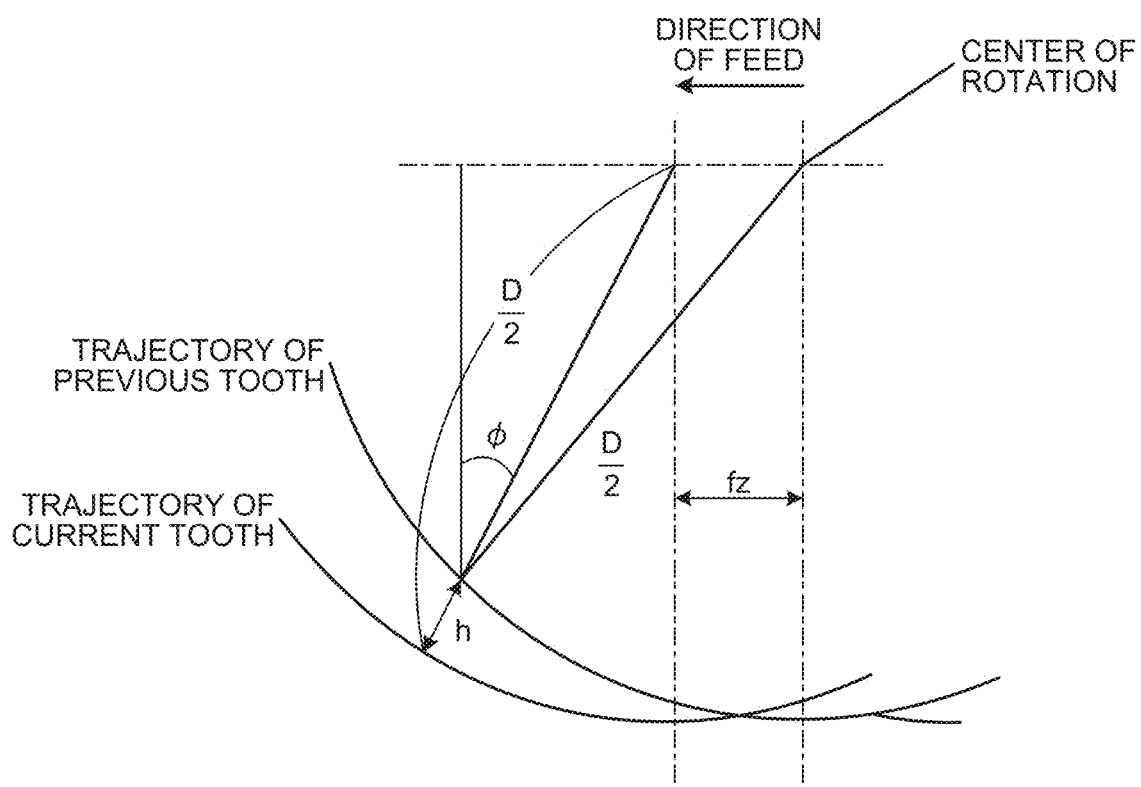
FIG. 4 is an illustrative drawing relating to the feed rate per tooth of the cutting tool.
Figure 5:
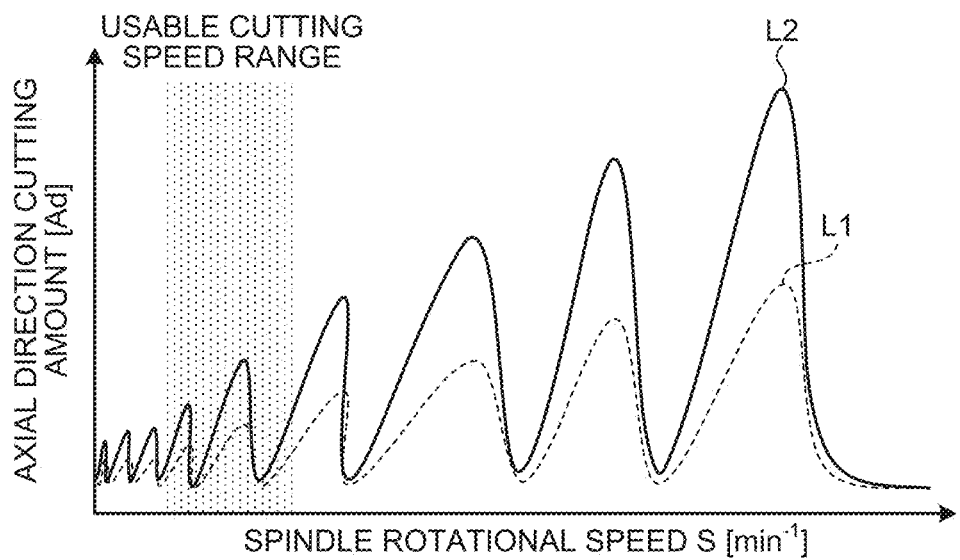
FIG. 5 is an example of a graph relating to the amount of cutting in the axial direction varying with the spindle rotational speed.
Figure 6:
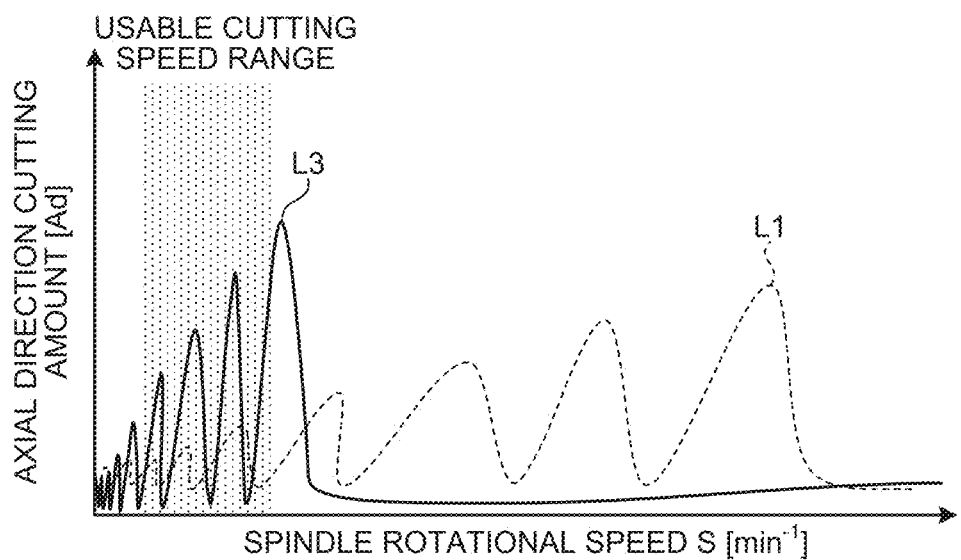
FIG. 6 is another example of a graph relating to the amount of cutting in the axial direction varying with the spindle rotational speed.

FIG. 1 is a schematic view of a cutting tool according to an embodiment. FIG. 2 is a flowchart of a method of setting cutting work conditions according to the embodiment. FIG. 3 is an illustrative drawing relating to the amount of cutting of the cutting tool in the radial direction. FIG. 4 is an illustrative drawing relating to the feed rate per tooth of the cutting tool. FIG. 5 is an example of a graph relating to the amount of cutting in the axial direction varying with the spindle rotational speed. FIG. 6 is another example of a graph relating to the amount of cutting in the axial direction varying with the spindle rotational speed.

In the method of setting cutting conditions and the method of cutting of the present embodiment, a heat-resistant alloy is used as a material to be machined. Examples of the heat-resistant alloy include titanium alloy and nickel-base alloy. Heat-resistant alloys have lower thermal conductivity and higher Young's modulus. By the method of setting cutting conditions and the method of cutting of the present embodiment, such cutting conditions are set that increase the amount of cutting (the volume cut away from the heat-resistant alloy) while suppressing generation of machining-induced heat during the cutting work. A cutting tool 10 will be first described prior to description of the method of setting cutting conditions and the method of cutting.

The cutting tool 10 is a tool usually referred to as an end mill and includes a long shaft 14 mounted on a spindle 5 and extended in an axial direction and a plurality of teeth 15 formed around the outer circumference of the shaft 14. The cutting tool 10 in the present embodiment has a larger number of teeth with the intention to decrease the amount of cutting per tooth to suppress generation of machining-induced heat per tooth, while to increase the amount of cutting per revolution of the cutting tool 10. Specifically, the cutting tool 10 used in the later-described cutting test includes, for example, 15 teeth 15 on the outer circumference of the shaft 14. The cutting tool 10 has an outer diameter D of, for example, about 20 mm.

The cutting tool 10 is mounted with its base end fixed to the spindle 5 and its front end portion projecting from the spindle 5. The spindle 5 rotates the mounted cutting tool 10 at a certain rotational speed (the spindle rotational speed) in the cutting process. The cutting tool 10 has a projection length L, which is the length from the spindle 5 to the front end. The cutting tool 10 has a larger projection length L that allows the cutting tool 10 to be less rigid, with the intention to make the eigenfrequency of the cutting tool 10 mounted on the spindle 5 close to the spindle rotational speed of the spindle 5. More specifically, the projection length L of the cutting tool 10 in the axial direction is determined, for the outer diameter D, to have the ratio L/D at equal to or larger than 3.5. This ratio L/D is one of the cutting conditions. The ratio L/D needs to be equal to or greater than 3.5, preferably equal to or greater than 4.5, and optimally 5. When the number of teeth of the cutting tool is given as N, a cutting condition (L/D)×N, consisting of L/D and N, is preferably from 40 to 120 when L/D is 3.5 to 5, and preferably equal to or greater than 90 when L/D is larger than 5.

A method of setting heat-resistant alloy cutting conditions in the present embodiment will now be described with reference to FIG. 2. The method of setting cutting conditions sets such cutting conditions that include the type of cutting tool 10 to be used, the spindle rotational speed of the spindle 5, the amount of cutting in the axial direction of the cutting tool 10, the amount of cutting in the radial direction of the cutting tool 10, and the feed rate per tooth of the cutting tool 10, specifically.

The method of setting cutting conditions selects the type of cutting tool 10 to be used (Step S10). Such a cutting tool 10 is selected that fulfills the above ratio L/D and the number of teeth N. The selected cutting tool 10 is mounted on the spindle 5 and is, for example, tapped, to measure the eigenfrequency ωf of the cutting tool 10 mounted on the spindle 5 (Step S12). A stable rotational speed Sn of the spindle 5 is calculated using the following predetermined formula (1) based on parameters including the measured eigenfrequency ωf of the cutting tool 10 (Step S14).

$$Sn = \omega f \times 60 \div (N \times n) \quad (1)$$

Sn: a stable rotational speed [min$^{-1}$] (n: 1, 2, 3)
ωf: the eigenfrequency of the cutting tool [Hz]
N: the number of teeth
n: a natural number of any one of 1, 2, and 3

The stable rotational speed Sn in the above formula (1) is obtained on each of the natural numbers n of 1 to 3, and three stable rotational speeds Sn are therefore calculated in the present embodiment.

A cutting speed Vcn of the cutting tool 10 is calculated using the following predetermined formula (2) based on parameters including the calculated stable rotational speed Sn. The calculated cutting speed Vcn is subsequently determined whether to satisfy the cutting condition (Step S16).

$$Vcn = Sn \times \pi \times D \div 1000 \quad (2)$$

Vcn: a cutting speed [m/min] (n: 1, 2, 3)
D: the outer diameter of the cutting tool As with the formula (1), the cutting speed Vcn in the above formula (2) is obtained on each of the natural numbers n of 1 to 3, and three cutting speeds Vcn are therefore calculated in the present embodiment.

According to the cutting conditions, the cutting tool 10 to be used needs to fulfill the condition of 100 [m/min]<Vcn [m/min]<300 [m/min]. At Step S16, it is determined whether at least one cutting speed Vcn of the obtained three cutting speeds Vcn is in the above range of cutting speed. At Step S16, if all the obtained three cutting speeds Vcn are out of the above range of cutting speed (No at Step S16), the process returns to Step S10 to make another selection for the cutting tool 10. At Step S16, if at least one of the obtained three cutting speeds Vcn is in the above range of cutting speed Vcn (Yes at Step S16), the spindle rotational speed of the spindle 5 is set based on the cutting speed Vcn (Step S18).

If only one cutting speed Vcn fulfills the cutting condition at Step S16, at Step S18, a stable rotational speed Sn corresponding to the cutting speed Vcn is set as the spindle rotational speed of the spindle 5. If two or more cutting speeds Vcn fulfill the cutting condition at Step S16, at Step S18, a stable rotational speed Sn corresponding to the highest cutting speed Vcn of the cutting speeds Vcn is set as the spindle rotational speed of the spindle 5. In this manner, at Step S18, a spindle rotational speed is set as one of the cutting conditions.

An axial direction cutting amount Ad, the amount of cutting in the axial direction of the cutting tool 10, as one of the cutting conditions, is subsequently set based on the projection length L of the cutting tool 10, the flute length of the tooth 15, and the form to be shaped of the heat-resistant alloy (Step S20).

A radial direction cutting amount Rd, the amount of cutting in the radial direction of the cutting tool 10 is subsequently set as one of the cutting conditions (Step S22). The radial direction cutting amount Rd of the cutting tool 10 is set in the range from a smallest radial direction cutting amount Rd_min to a largest radial direction cutting amount Rd_max.

The smallest radial direction cutting amount Rd_min and the largest radial direction cutting amount Rd_max will now be described with reference to FIG. 3. The smallest radial direction cutting amount Rd_min [mm] indicates the radial direction cutting amount in which one of a plurality of teeth 15 is constantly in contact with the heat-resistant alloy. With none of the teeth 15 contacting the heat-resistant alloy, separation of the teeth 15 of the cutting tool 10 from the heat-resistant alloy causes vibration of the cutting tool 10.

The smallest radial direction cutting amount Rd_min is given by the following formula (3). When the angle between the teeth 15 of the cutting tool 10 is given as θ, the angle θ is given by "θ [deg]=360°/N (the number of teeth)".

$$Rd\_min = R - R\cos(\theta/2) \quad (3)$$

Rd_min: the smallest radial direction cutting amount
R: the radius of the cutting tool
θ: the angle between the teeth The largest radial direction cutting amount Rd_max [mm] indicates the radial direction cutting amount in which three or more teeth 15 of a plurality of teeth 15 are not in contact with the heat-resistant alloy. Three or more teeth 15 of the cutting tool 10 in contact with the heat-resistant alloy cause chatter vibration of the cutting tool 10. The largest radial direction cutting amount Rd_max is given by the following formula (4).

$$Rd\_max = R - R\cos\theta \quad (4)$$

Rd_max: the largest radial direction cutting amount
R: the radius of the cutting tool
θ: the angle between the teeth The radial direction cutting amount Rd of the cutting tool 10 is set in the range from the smallest radial direction cutting amount Rd_min to the largest radial direction cutting amount Rd_max at Step S22, and the feed rate per tooth of the cutting tool 10, as one of the cutting conditions, is subsequently set (Step S24). The feed rate per tooth fz [mm/tooth] is set based on the cut cross-sectional area per tooth, given by multiplying the thickness of removal by the width of cutting, and the amount of inclination of the cutting tool 10 with respect to the axial direction.

As illustrated in FIG. 4, when the feed rate per tooth fz is set, the thickness of removal h is calculated using the following formula (5). The amount of inclination of the cutting tool 10 is calculated by a prior process simulation relating to the cutting.

$$h = \left(\frac{D}{2} + fz\sin\theta\right) - \sqrt{\left(\frac{D}{2}\right)^2 + (\sin^2\theta - 1)fz^2}$$

h: the thickness of removal
D: the outer diameter of the cutting tool
fz: the feed rate per tooth When the thickness of removal h and the amount of inclination δ of the cutting tool 10 are calculated, the thickness of removal h is determined whether to be smaller than a preset threshold α (a constant) (h<α), and the amount of inclination δ is determined whether to be smaller than a preset threshold β (a constant) (δ<β) (Step S26). At Step S26, upon determination that neither conditions h<α nor δ<β is fulfilled (No at Step S26), the process returns to Step S22, and the radial direction cutting amount Rd is newly set in the range from the smallest radial direction cutting amount Rd_min to the largest radial direction cutting amount Rd_max. At Step S26, upon determination that the conditions h<α and δ<β are fulfilled (Yes at Step S26), the radial direction cutting amount Rd and the feed rate fz, set at Step S22 and Step S24, are set as the cutting conditions, and the process of setting cutting conditions ends.

The axial direction cutting amount varying with the spindle rotational speed will now be described with reference to FIG. 5 and FIG. 6. In the graphs of FIG. 5 and FIG. 6, the abscissa gives the spindle rotational speed S [min⁻¹], and the ordinate gives the axial direction cutting amount Ad.

In FIG. 5 and FIG. 6, a dotted line L1 is a conventional line in which the method of setting cutting conditions of the present embodiment is not adopted.

A solid line L2 in FIG. 5 is a line in which the radial direction cutting amount Rd, set from Step S22 to Step S26 in FIG. 2, is applied as the cutting condition. As illustrated in FIG. 5, the line L2 of the present embodiment, in which the radial direction cutting amount Rd is set, has been recognized to have the axial direction cutting amount Ad increased compared to the conventional line L1.

A solid line L3 of FIG. 6 is a line in which the cutting tool 10 selected at Step S10 to S16 in FIG. 2 is applied as the cutting condition. As illustrated in FIG. 6, on the line L3 of the present embodiment in which the selected cutting tool 10 is used, a plurality of peaks have been recognized to shift into the range of cutting speed usable by the spindle 5, compared to the conventional line L1. Because the peaks on the line L3 are portions where the eigenfrequency ωf of the cutting tool 10 and the spindle rotational speed S of the spindle 5 resonate with each other, making higher peaks shift to the usable cutting speed range allows selection of a spindle rotational speed having a larger axial direction cutting amount Ad.

Figure 7:
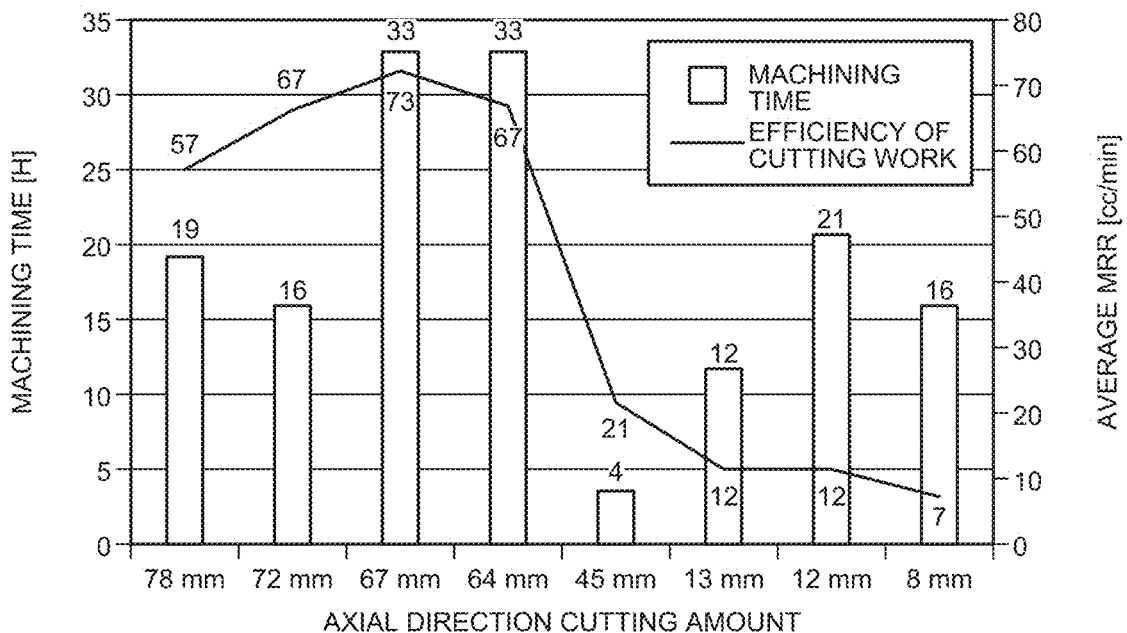
FIG. 7 is an example of a graph relating to the machining time and the efficiency of cutting work for the amount of cutting in the axial direction.
Figure 8:
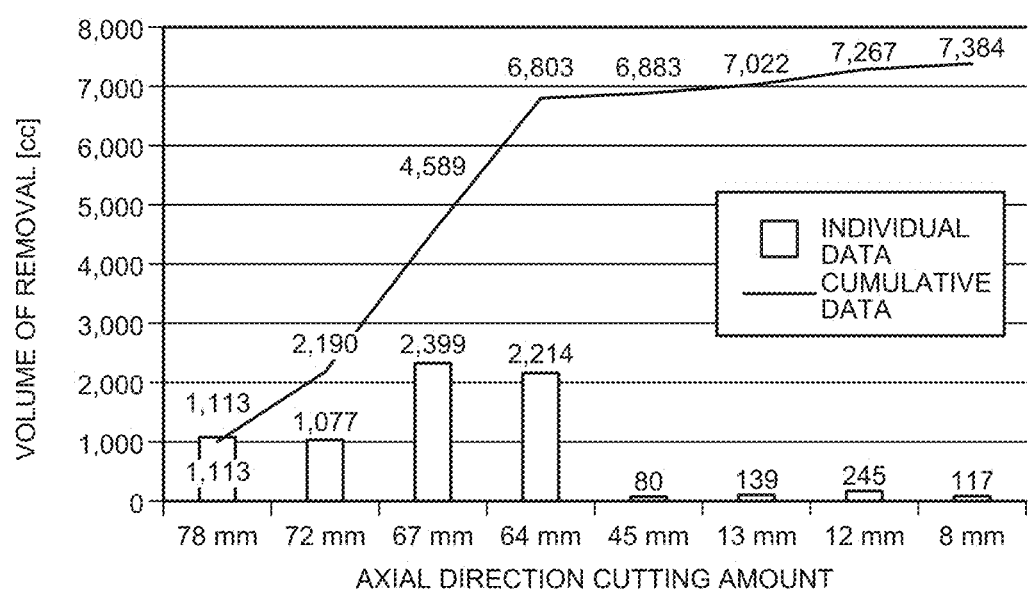
FIG. 8 is an example of a graph relating to the volume of removal for the amount of cutting in the axial direction.

The machining time and the volume of removal (the amount of cutting) when a heat-resistant alloy is cut with the cutting tool 10 based on the cutting conditions, set by the method of setting heat-resistant alloy cutting conditions of the present embodiment, will now be described with reference to FIG. 7 and FIG. 8. FIG. 7 is an example of a graph relating to the machining time and the efficiency of cutting work for the axial direction cutting amount. FIG. 8 is an example of a graph relating to the volume of removal for the axial direction cutting amount. In FIG. 7 and FIG. 8, the cutting tool 10 has 15 teeth 15 and has an outer diameter D of 20 mm and a projection length L of 80 mm. The radial direction cutting amount Rd of the cutting tool 10 is constant during the cutting process on the heat-resistant alloy.

In FIG. 7, the abscissa gives the axial direction cutting amount Ad, and the ordinate on the left gives the machining time [H], and the ordinate on the right gives the average MMC (the efficiency of cutting work) [cc/min]. In FIG. 7, it has been recognized that a larger axial direction cutting amount further improves the efficiency of cutting work, and more specifically, the axial direction cutting amount set between 45 mm and 72 mm markedly improves the efficiency of cutting work.

In FIG. 8, the abscissa gives the axial direction cutting amount Ad, and the ordinate gives the volume of removal [cc]. In FIG. 8, it has been recognized that a larger axial direction cutting amount results in a larger volume of removal, and more specifically, the axial direction cutting amount set between 45 mm and 72 mm markedly increases the volume of removal.

In FIG. 7 and FIG. 8, it has been recognized that an axial direction cutting amount of equal to or larger than 20 mm gives a volume of removal of 6883 cc, a machining time of 105 min, and an average MMC of 65.6 cc/min. It has further been recognized that an axial direction cutting amount of smaller than 20 mm gives a volume of removal of 501 cc, a machining time of 49 min, and an average MMC of 10.2 cc/min. It has been further recognized that the overall axial direction cutting amount gives a volume of removal of 7384 cc, a machining time of 154 min, and an average MMC of 47.9 cc/min.

Figure 9:
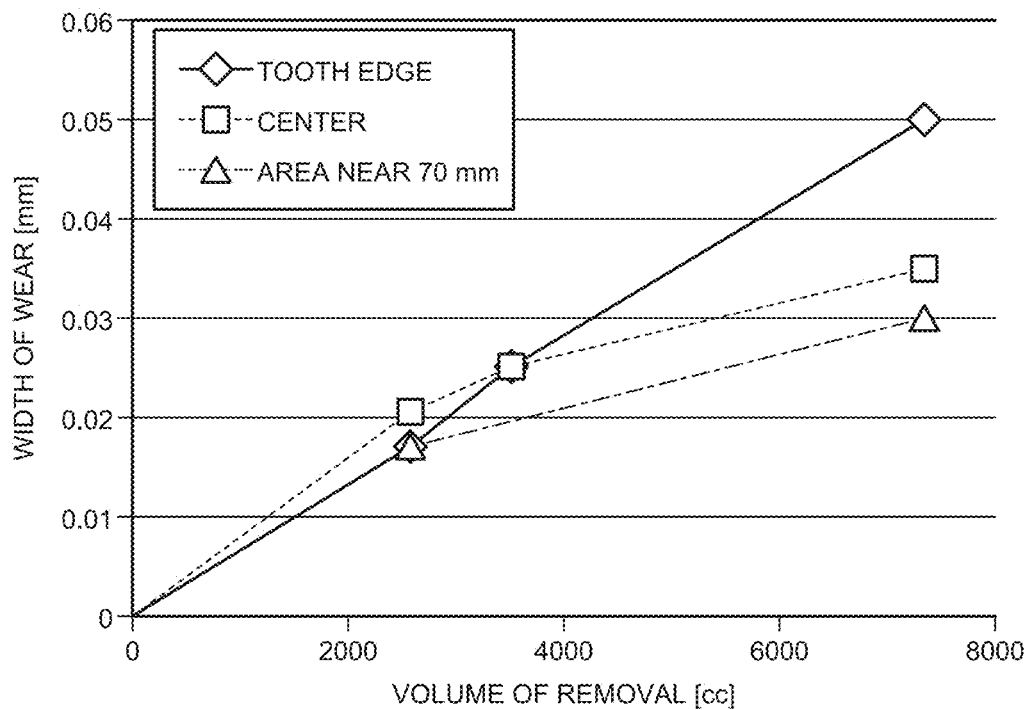
FIG. 9 is an example of a graph relating to the width of wear varying with the volume of removal.
Figure 10:
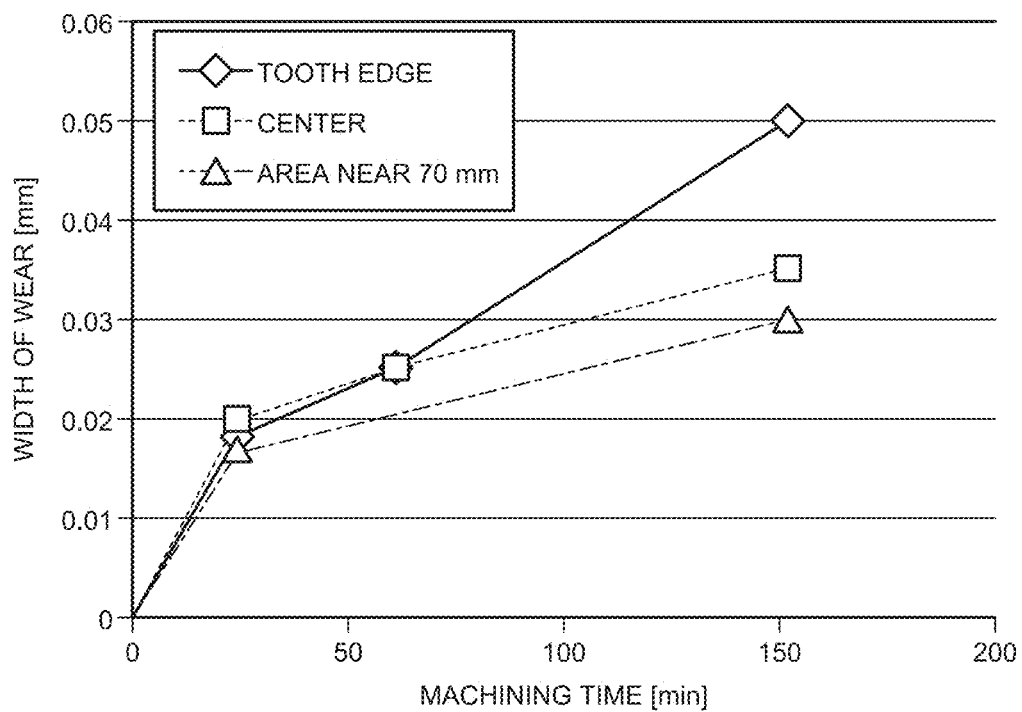
FIG. 10 is an example of a graph relating to the width of wear varying with the machining time.

Wear of the cutting tool 10 after cutting a heat-resistant alloy under the cutting conditions, set by the method of setting heat-resistant alloy cutting conditions of the present embodiment, will now be described with reference to FIG. 9 and FIG. 10. FIG. 9 is an example of a graph relating to the width of wear varying with the volume of removal. FIG. 10 is an example of a graph relating to the width of wear varying with the machining time. The cutting tool 10 used in FIG. 9 and FIG. 10 is the same as that used in FIG. 7 and FIG. 8.

In FIG. 9, the abscissa gives the volume of removal [cc], and the ordinate on the left gives the width of wear [mm]. In FIG. 9, a white rhombus (◇) indicates the width of wear on the edge of the front end of the tooth 15 in the axial direction, a white rectangle (□), indicates the width of wear at the center of the tooth 15 in the axial direction, and a white triangle (Δ) indicates the width of wear on the edge of the rear end (located about 70 mm away from the front edge) of the tooth 15 in the axial direction. As illustrated in FIG. 9, the tooth 15 of the cutting tool 10 further wears with an increase in the volume of removal. In this case, however, the width of wear substantially linearly changes. It has therefore been recognized that the wear stably proceeds and that the change in the width of wear is small.

In FIG. 10, the abscissa gives the machining time [min], and the ordinate on the left gives the width of wear [mm]. As with FIG. 9, in FIG. 10, a white rhombus (◇) indicates the width of wear on the edge of the front end of the tooth 15 in the axial direction, a white rectangle (□), indicates the width of wear at the center of the tooth 15 in the axial direction, and a white triangle (Δ) indicates the width of wear on the edge of the rear end (located about 70 mm away from the front edge) of the tooth 15 in the axial direction. As illustrated in FIG. 10, the tooth 15 of the cutting tool 10 further wears with an increase in the machining time. In this case, however, as is the case of FIG. 9, the width of wear substantially linearly changes. It has therefore been recognized that the wear stably proceeds and that the change in the width of wear is small.

As described above, according to the embodiment, the cutting tool 10 can cut a heat-resistant alloy with at least a tooth of a plurality of teeth 15 of the cutting tool 10 constantly in contact with the heat-resistant alloy. The constant contact can suppress vibration of the cutting tool 10, which is caused with the teeth of the cutting tool 10 separated from the heat-resistant alloy. Moreover, the cutting tool 10 can cut the heat-resistant alloy with three or more teeth 15 of the teeth 15 of the cutting tool 10 not in contact with the heat-resistant alloy. This manner can suppress chatter vibration of the cutting tool 10, which is caused with three or more teeth 15 of the cutting tool 10 contacting the heat-resistant alloy. Suppressing vibration of the cutting tool 10 can increase the amount of cutting (the volume of removal) of the cutting tool 10 and thus can suppress a reduction in the efficiency of cutting work on the heat-resistant alloy. This manner can increase the amount of cutting of the cutting tool 10, and therefore allows even a small cutting tool 10 to perform sufficient cutting work without reducing the efficiency of work. It is therefore possible to provide cutting work on even a small piece and to make the tool versatile. Furthermore, suppressing vibration of the cutting tool 10 can suppress wear of the teeth 15 of the cutting tool 10 and thus can extend the life of the cutting tool 10. Such a small cutting tool 10 cuts a small amount in the radial direction, which is beneficial in suppressing generation of machining-induced heat per tooth. The efficiency of cutting work can be improved by increasing the number of cuttings per revolution by increasing the number of teeth and further improved by increasing the rotational speed of the cutting tool 10 (the spindle 5).

According to the embodiment, the cutting tool 10 cutting a constant amount in the radial direction allows stable cutting work.

According to the embodiment, the cutting tool 10 is allowed to have a larger projection length L by setting the rate L/D at 3.5 or greater. The cutting tool 10 fixed to the spindle 5 is therefore allowed to be less rigid, which can decrease the eigenfrequency ωf of the cutting tool 10. When the eigenfrequency of the cutting tool 10 gets close to a usable spindle rotational speed of the spindle 5, the amount of cutting of the cutting tool is increased. In this manner, the efficiency of cutting work can be further improved.

According to the embodiment, the cutting tool 10 can cut a heat-resistant alloy at a proper cutting speed Vcn with the spindle 5 rotating at a constant rotational speed. A stable rotational speed corresponding to the highest cutting speed Vcn of a plurality of cutting speeds Vcn is allocated for the spindle rotational speed of the spindle 5, which can improve the efficiency of cutting work.

According to the embodiment, a proper feed rate fz per tooth of the cutting tool 10 can be set, which enables proper cutting work.

According to the embodiment, if the feed rate fz per tooth of the cutting tool 10 is not properly set, the feed rate fz can be reset. This configuration allows setting of a proper feed rate fz per tooth.

In the present embodiment, a proper cutting tool 10 is selected, and a proper radial direction cutting amount Rd is set. Instead, the method of setting cutting conditions may include either of the cutting conditions. In other words, the method of setting cutting conditions may include Step S10 to Step S16 without including Step S22 of FIG. 2 or may include Step S22 without including Step S10 to Step S16 of FIG. 2.

REFERENCE SIGNS LIST

5 SPINDLE
10 CUTTING TOOL
14 SHAFT
15 TOOTH
D OUTER DIAMETER
L PROJECTION LENGTH
Ad AXIAL DIRECTION CUTTING AMOUNT
Rd RADIAL DIRECTION CUTTING AMOUNT

The invention claimed is:

1. A method of setting a heat-resistant alloy cutting condition that is used to set a cutting condition under which a heat-resistant alloy is cut with a cutting tool mounted on a spindle, the cutting tool being an end mill including a shaft mounted on the spindle and extended in an axial direction and a plurality of teeth disposed on an outer circumference of the shaft, and the cutting condition includes a radial direction cutting amount in a radial direction of the cutting tool, the method comprising
when the radial direction cutting amount in which one of the teeth is constantly in contact with the heat-resistant alloy is given as a smallest radial direction cutting amount, and
the radial direction cutting amount in which three or more teeth of the teeth are not in contact with the heat-resistant alloy is given as a largest radial direction cutting amount, setting the radial direction cutting amount of the cutting tool in a range from the smallest radial direction cutting amount to the largest radial direction cutting amount, wherein when a when a length of projection of the cutting tool from the spindle is given as L, a tool diameter of the cutting tool is given as D, and the number of teeth of the cutting tool is given as N, the cutting condition includes conditions that (L/D)×N is from 40 to 120 for L/D being 3.5 to 5, and (L/D)×N is equal to or greater than 90 for L/D being larger than 5.

2. The method of setting a heat-resistant alloy cutting condition according to claim 1, wherein the cutting condition includes a condition under which the cutting tool cuts the heat-resistant alloy at a constant radial direction cutting amount.

3. The method of setting a heat-resistant alloy cutting condition according to claim 1, wherein a stable rotational speed of the spindle is calculated using a certain formula based on a parameter including an eigenfrequency of the cutting tool, a cutting speed of the cutting tool is calculated using a certain formula based on a parameter including the calculated stable rotational speed, and when the calculated cutting speed is given as Vcn [m/min], the cutting condition includes a condition under which the cutting tool fulfilling 100 [m/min]<Vcn [m/min]<300 [m/min] is selected.

4. The method of setting a heat-resistant alloy cutting condition according to claim 3, wherein a plurality of the stable rotational speeds are calculated, a plurality of the cutting speeds are calculated based on the stable rotational speeds, a largest cutting speed of the cutting speeds, fulfilling 100 [m/min]<Vcn [m/min]<300 [m/min] is selected, and the cutting condition includes a condition under which the stable rotational speed corresponding to the selected cutting speed is set as a spindle rotational speed of the spindle.

5. The method of setting a heat-resistant alloy cutting condition according to claim 1, wherein the cutting condition includes a feed rate per tooth of the cutting tool, and the feed rate per tooth of the cutting tool is set based on a cut cross-sectional area per tooth, given by multiplying a thickness of removal by a width of cutting, and an amount of inclination of the cutting tool with respect to the axial direction.

6. The method of setting a heat-resistant alloy cutting condition according to claim 5, wherein when at least one of the thickness of removal and the amount of inclination is equal to or greater than a preset threshold, the feed rate per tooth of the cutting tool is reset to be smaller than the feed rate previously set.

7. The method of setting a heat-resistant alloy cutting condition according to claim 1, further comprising cutting the heat-resistant alloy using the cutting tool.

* * * * *